Dec. 9, 1969    H. S. SUOMINEN ET AL    3,482,761
PLASTIC BAG OR THE LIKE WITH HANDLE
Filed Jan. 8, 1968

INVENTORS
H. S. Suominen
V. J. Makinen
A. S. Lindstrom
BY Hall, Pollock & Vande Sande
ATTORNEY United States Patent Office 3,482,761
Patented Dec. 9, 1969

3,482,761
PLASTIC BAG OR THE LIKE WITH HANDLE
Heikki S. Suominen, Petsamonkatu 14, Tampere, Finland, and Viljo J. Makinen and Aarno S. Lindstrom, Tampere, Finland; said Makinen and said Lindstrom, assignors to said Suominen
Filed Jan. 8, 1968, Ser. No. 699,988
Claims priority, application Finland, Jan. 17, 1967, 115/67
Int. Cl. B65d 33/10
U.S. Cl. 229—54    3 Claims

ABSTRACT OF THE DISCLOSURE

The disclosure relates to plastic bags with handles formed from a tube of thin film plastic material and with the handles formed from the same material as the bag walls. Portions of the side walls of the tube of plastic material are cut away to form the handles, and in order to provide handles of sufficient strength to carry the load and to properly distribute the resulting stresses over the entire side walls of the bag, the tubular thin film of plastic is extruded so as to have portions thereof formed of a thicker material than the rest of the bag walls, and the handles are located so as to include portions of the thicker material.

BACKGROUND OF THE INVENTION

Figure 1:
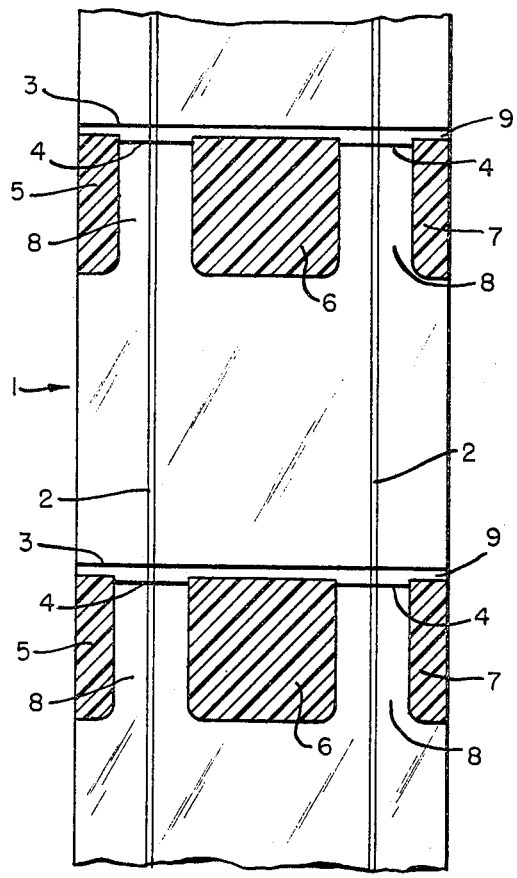

It is well-known in the art to provide plastic bags which are formed from a continuous tube of extruded plastic material. Successive bags are cut from the tubular material with the length of the bag lying along the axis of the tube. The bottom of each cutout portion is heat sealed to form the closed bottom of the bag, and additional portions of the tube are cut away at the other or top end of the bag to form spaced carrying handles which are heat sealed at their topmost edges to form continuous carrying loops extending between the front and rear bag walls.

It is also old in the art to provide bags of this general type in which the carrying means for the bag does not comprise space loops but instead is formed of registering hand holes or apertures cut out of the front and back walls and with the mouth of the bag open. With both types of the aforesaid constructions, one of the problems which arises is that when an appreciable load is carried in the bags, there is a high concentration of forces adjacent the handle or carrying means. Thus, where the spaced loops are provided by cutouts at the top of the bag, there is a high concentration of tensile forces along the loop forming the handle and also at the point of juncture of each handle or loop with the front and rear bag walls. Similarly, with the type of construction using the registering apertures in the front and back bag walls, there is a high concentration of forces in the material of the front and back walls immediately adjacent the aperture. One way to overcome this problem is to construct the bag of sufficiently thick thermoplastic film to ensure that the resultant forces can readily be borne without rupturing the material of which the bag is formed for the expected size of load carried in the bag. This, however, results in a product which is not commercially competitive because of the excessive amount of material used in the manufacture of each bag. Another solution which has been devised is to laminate extra strips or bands of thermoplastic material to the bags and/or to the handles of the bag in such a manner that the forces resulting from the carrying of a heavy load in the bag are distributed along the thus reinforced portions. This attempted solution is also not entirely satisfactory because of the difficulties inherent in the lamination process which not only involves extra material costs but also reduces the speed of manufacture.

It is proposed, according to the present invention, to overcome the aforesaid difficulties in bag manufacture by extruding the thermoplastic tube of material with thickened walls over selected portions thereof in such manner that the thickened portions are so disposed as to absorb the stresses resulting from the carrying of a heavy load in the bag. In the illustrated embodiment, which is particularly concerned with a type of bag construction providing for two spaced carrying handles formed by suitable cutouts formed at the top of the bag, thickened extruded portions are provided about the periphery of the tube at four different locations so that, in the resulting bags, there will be two spaced reinforced portions on both the front and rear bag walls with each pair on one of the bag walls being spaced so as to be longitudinally aligned with the carrying handles or straps.

Figure 2:
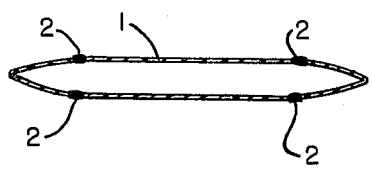

Referring to the drawings:

FIGURE 1 illustrates the manner of construction of a bag of the present invention from a continuous tube of extruded thermoplastic material; and FIGURE 2 is a cross-sectional illustration of the extruded tube from which the bag of the present invention is made, particularly illustrating the thickened extruded portions.

The bag of the present invention is made from a tubular sheath 1 of a thermoplastic, heat sealable film. As shown in FIGURE 1, crosswise seams 3 are formed in the tubular material at spaced intervals corresponding to the desired longitudinal length of each bag. Such crosswise seams may be formed by heat welded together in a known manner the front and rear walls of the tubular sheath 1. Spaced portions 5, 6, and 7 are cut out of the tubular sheath as shown in FIGURE 1, and the portions cut out extend upwardly into the crosswise seam 3 so that the subsequent cutting operation through the seams 3 at 9, i.e., along the midpoint of the seam 3, will intersect the cutout portions 5, 6, and 7 and thereby leave an open mouth for the bag other than for the carrying straps 8. It will be noted that the front and rear carrying straps of each pair are joined together at the top by the crosswise seam 3.

It can be appreciated that a bag formed with spaced carrying handles in the manner illustrated in FIGURE 1 will, when heavily loaded, produce a high degree of stress of the thin film material along those portions of the front and rear side walls which are longitudinally aligned with the carrying straps or handles 8 and that this will tend to rupture the material. For this reason, the bag of this invention is provided with reinforced portions 2 comprising longitudinally extending webs of thickened material which are formed in the extrusion of the material from the extruder die. In FIGURE 2, the thickened portions are shown as comprising relatively narrow bands, but it will be apparent to one skilled in the art that the thickened extruded portions can be much wider than shown in FIGURES 1 and 2 and may, if desired, extend at least as wide as the width of each of the carrying straps 8.

It will also be apparent to one skilled in the art that a single thickened extruded band may be provided on both sides of the tubular sheath, but extending generally down the midsection thereof. In such an embodiment (not shown) the handles for the bags may be formed by punching out a finger grip lying in the thickened extruded portion so that the stresses of carrying the loaded bag are borne by the thicker weighted material running along the center of the front and rear bag walls.

It is, of course, also within the scope of the inveniton to make the reinforced or thickened zones of extruded material of a different color than the rest of the material of the bags by extruding the thickened zones from different nozzles. Also, instead of providing merely one thickened longitudinal zone in each of the handles 8, it is, of course, possible to provide two or more such thickened portions in each handle member 8.

Having described an improved thermoplastic bag construction as a specific embodiment of the invention, we desire to be understood that various modifications and alterations may be made to specific forms shown without departing from the spirit or scope of this invention.

The embodiments of the invention in which an exclusive property or privilege is claimed are defined as follows:

1. A thermoplastic bag formed from a flattened tube of heat sealable sheet material having front and back panels, said panels welded together transversely of the longitudinal axis of the tube to form a closed bottom for the bag, at least one carrying means connected to each of said panels at the top of the bag, at least one reinforced section extending substantially over the length of each of said front and back panels and being aligned with a respective carrying means, said reinforcing sections comprising a zone of a single layer of said sheet material which is of increased thickness as compared to that of the remainder of said sheet material.

2. The thermoplastic bag of claim 1 in which said carrying means includes at least one loop formed from said front and back panels which are heat sealed together at their topmost portions.

3. The thermoplastic bag of claim 2 in which said carrying means comprises two spaced handles and said reinforcing means comprises a zone of increased thickness which is longitudinally aligned with each said loop.

References Cited

UNITED STATES PATENTS

| | | | |
|---|---|---|---|
| 3,180,557 | 4/1965 | Thulin | 229—54 |
| 3,352,411 | 11/1967 | Schwarkopf | 229—54 X |

FOREIGN PATENTS 1,463,187  11/1966  France.

DAVID M. BOCKENEK, Primary Examiner

U.S. Cl. X.R.

150—1.7